US008230688B2

(12) United States Patent
Wilson et al.

(10) Patent No.: US 8,230,688 B2
(45) Date of Patent: Jul. 31, 2012

(54) MODULAR TRANSVANE ASSEMBLY

(75) Inventors: Jody W. Wilson, Winter Springs, FL (US); Raymond S. Nordlund, Orlando, FL (US); Richard C. Charron, West Palm Beach, FL (US)

(73) Assignee: Siemens Energy, Inc., Orlando, FL (US)

( * ) Notice: Subject to any disclaimer, the term of this patent is extended or adjusted under 35 U.S.C. 154(b) by 674 days.

(21) Appl. No.: 12/420,149

(22) Filed: Apr. 8, 2009

(65) Prior Publication Data

US 2010/0077719 A1 Apr. 1, 2010

Related U.S. Application Data

(60) Provisional application No. 61/100,853, filed on Sep. 29, 2008.

(51) Int. Cl.
*F02C 3/00* (2006.01)

(52) U.S. Cl. ........................................ 60/752; 60/39.37

(58) Field of Classification Search .................... 60/752, 60/799, 39.37, 269, 804, 805, 722, 226.1, 60/263, 264, 753–760, 806
See application file for complete search history.

(56) References Cited

U.S. PATENT DOCUMENTS

| | | | | |
|---|---|---|---|---|
| 2,056,198 | A | 10/1936 | Lasley | |
| 2,567,079 | A | 9/1951 | Owner et al. | |
| 2,851,853 | A | 9/1958 | Quick | |
| 3,238,718 | A | 3/1966 | Hill | |
| 3,608,310 | A | 9/1971 | Vaught | |
| 3,657,882 | A | 4/1972 | Hugoson | |
| 3,804,335 | A | 4/1974 | Sohre | |
| 4,081,957 | A | 4/1978 | Cox, Jr. | |
| 5,761,898 | A | 6/1998 | Barnes et al. | |
| 5,953,919 | A | 9/1999 | Meylan | |
| 6,644,032 | B1 | 11/2003 | Jorgensen et al. | |
| 7,958,734 | B2 * | 6/2011 | Paprotna et al. | 60/800 |
| 2004/0003599 | A1 | 1/2004 | Ingram | |
| 2006/0288707 | A1 | 12/2006 | Weaver et al. | |
| 2007/0017225 | A1 | 1/2007 | Bancalari et al. | |

FOREIGN PATENT DOCUMENTS

EP 1903184 A2 3/2008

OTHER PUBLICATIONS

U.S. Appl. No. 11/498,479, filed Aug. 3, 2006; Robert J. Bland, first Inventor.

* cited by examiner

*Primary Examiner* — Ehud Gartenberg
*Assistant Examiner* — Vikansha Dwivedi

(57) ABSTRACT

An arrangement for delivering gasses from can combustors of a can annular gas turbine combustion engine to a turbine first stage section including a first row of turbine blades, the arrangement including a flow-directing structure for each combustor, wherein each flow-directing structure includes a straight path and an annular chamber end, wherein the annular chamber ends together define an annular chamber for delivering the gas flow to the turbine first stage section, wherein gasses flow from respective combustors, through respective straight paths, and into the annular chamber as respective straight gas flows, and wherein the annular chamber is configured to unite the respective straight gas flows along respective shear planes to form a singular annular gas flow, and wherein the annular chamber is configured to impart circumferential motion to the singular annular gas flow before the singular annular gas flow exits the annular chamber to the first row of blades.

19 Claims, 10 Drawing Sheets

(Prior art)

(Prior art)

MODULAR TRANSVANE ASSEMBLY

This application claims benefit of the 29 Sep. 2008 filing date of U.S. provisional application No. 61/100,853.

FIELD OF THE INVENTION

This invention relates to gas turbine combustion engines. In particular, this invention relates to an assembly for transporting expanding gasses to the first row of turbine blades.

BACKGROUND OF THE INVENTION

Gas turbine combustion engines with can annular combustors require structures to transport the gasses coming from the combustors to respective circumferential portions of the first row of turbine blades, hereafter referred to simply as the first row of turbine blades. These structures must orient the flow of the gasses so that the flow contacts the first row of turbine blades at the proper angle, to produce optimal rotation of the turbine blades. Conventional structures include a transition, a vane, and seals. The transition transports the gasses to the proper location and directs the gasses into the vanes, which orient the gas flow as required and deliver the gas flow to the first row turbine of blades. The seals are used in between the components to help keep the gasses from escaping, and to smooth flow during the transition between the components.

Configurations of this nature reduce the amount of energy present in the gas flow as the flow travels toward the first row of turbine blades, and inherently require substantial cooling. Gas flow energy is lost through turbulence created in the flow as the flow transitions from one component to the next, and through gas flow loss through the seals. Gas flow loss through seals increases as seals wear due to vibration and ablation. Significant energy is also lost when the flow is redirected by the vanes. These configurations thus create inefficiencies in the flow which reduce the ability of the gas flow to impart rotation to the first row of turbine blades.

The cooled components are expensive and complicated to manufacture due to the cooling structures, exacting tolerance requirements, and unusual shapes. Layers of thermally insulated or such cooled components may wear and can be damaged, which requires repair or replacement, which creates costs in terms of materials, labor, and downtime. Thermal stresses also reduce the service life of the underlying materials. Further, the vanes and seals require a flow of cooling fluid. This requires energy and creates more opportunities for heat related component damage and associated costs.

Vanes are produced in segments and then assembled together to form a ring. This requires additional seals between the vane components, through which there is more gas flow loss. Further, these configurations usually require assembly of the components directly onto the engine in confined areas of the engine, which is time consuming and difficult.

BRIEF DESCRIPTION OF THE DRAWINGS

The invention is explained in the following description in view of the drawings that show.

DETAILED DESCRIPTION OF THE INVENTION

The inventors of the present system have designed an innovative arrangement, made of multiple, modular, interchangeable, transvane assemblies which direct and then combine individual gas flows from the cans of a can annular combustor of a gas turbine combustion engine into a singular annular gas flow with a circumferential component to the flow, which is then directed to the first row of turbine blades. The inventors of the present system observed that prior configurations for delivering flows of can-annular combustors to the first row of turbine blades kept each flow separate and distinct from the other flows all the way to the first row of turbine blades. As a result, between each flow about to contact the first row of turbine blades there is a gap, or trailing edge, where there is reduced or no flow delivered to the blades. These trailing edges, which vary in magnitude from design to design, create flow disturbances and associated energy losses. Consequently, as the first row blades rotate, they alternately see regions of a high volume of very hot flow, and cooler regions of reduced or little flow. The blades thus experience rapidly changing temperatures and aerodynamic loads as they rotate through these regions, and these oscillations shorten blade life.

Figure 1:
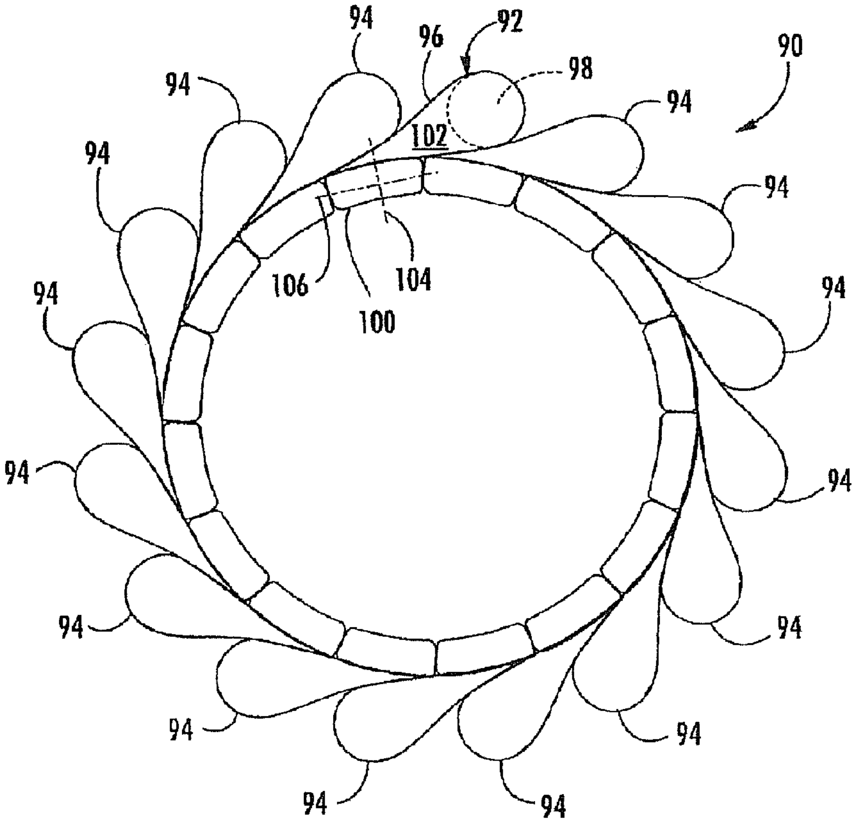
FIG. 1 shows a schematic representation of a one piece transition duct between the combustor can and the first row of turbine blades.

A recent design innovation, as disclosed in co-pending and commonly assigned United States patent application US 2007/0017225 to Bancalari et. al., incorporated herein by reference herein and shown in part in FIG. 1, replaces the conventional transition, seals, and vanes with an assembly of one piece transition ducts that transport expanded gasses from the combustion chamber directly to the first row of turbine blades, while simultaneously orienting the gas flow to properly interface with the first row of turbine blades. This orienting is achieved by curving and shaping each duct, and consequently each respective gas flow, along its length. By using fewer seals, aerodynamic losses due to seals are reduced, as are flow losses through the seals. The newer design uses the entire length of the duct to properly orient the flow, while the designs of the prior art used vanes at the end of the duct to orient the flow, which resulted in a relatively abrupt change in the flow direction, and associated energy losses. Further, this newer design reduces costs associated with assembly and maintenance.

Another recent design innovation, as disclosed in co-pending and commonly assigned U.S. patent application Ser. No. 12/190,060 to Charron filed on Aug. 12, 2008, shown in part in FIG. 2 and incorporated herein by reference, orients the combustor cans of the gas turbine combustor to permit the use of an assembly of components that form a straight flow path between each combustor can and a respective circumferential portion of the first row of turbine blades. In the Charron configuration, gasses flowing from each combustor can flow along an individual straight path, without mixing with any other flows, exit the assembly, and flow into the first row of turbine blades. As a result of these straight gas flow paths, there are fewer aerodynamic energy losses, and thus a greater amount of energy is delivered to the first row of turbine blades.

While the systems described in Bancalari and Charron represent improvements upon earlier designs, the present inventors have developed further improvements related to trailing edges, complexity, cost of manufacturing, and flexibility in design. The below described system reduces or eliminates these trailing edges, and realizes yet even further benefits.

The innovative system receives the gas flow from each combustor can, reduces the larger, circular cross sectional area of each flow to a smaller, essentially rectangular cross sectional area, and directs each flow to a common transvane annular chamber. Inside the chamber the individual gas flows unite into a singular annular gas flow, and the chamber also imparts a circumferential component to the flow direction of at least a portion of the singular annular gas flow. The singular annular gas flow then exits the annular chamber and flows directly onto the first row of turbine blades at an angle chosen to impart maximum rotation to the first row of turbine blades.

This configuration retains many of the benefits of the can combustor annular configuration of a gas turbine combustor, but also gains some of the advantages of an annular combustor configuration. For example, can annular combustor configurations reduce dynamic interactions between the combustors, but require the gas flows to be redirected before being delivered to the first row of turbine blades. Annular combustor configurations do not require gas flow redirection, but permit dynamic interactions in the common combustion zone. The present design retains the dynamics isolating characteristics of a can annular combustor configuration, but yet does not require flow redirection, which is a benefit of an annular combustor.

Further, the necking down of the cross sectional areas from a circular cross section at the entry point of the gas flow from the combustor can to a square or rectangular cross section serves multiple purposes. It creates a four sided flow which allows the top of one flow and the bottom of an adjacent air flow to abut inside the annular chamber, creating a plane of contact (i.e. shear wall) between adjacent flows, which helps constrain each flow in its place as the flows enter the annular chamber, yet permits the flows to fill the entire volume of the annular chamber. This shear wall replaces an actual hardware wall present in the prior art, and therefore it completely eliminates the trailing edge of such a wall. Also, this necking down creates a barrier which insulates the combustor can from pressure oscillations/pulsations, for example those pressure oscillations associated with the rotating blades, which can travel back to the combustor can in configurations without this necking down. This inventive design accomplishes the above with a modular design that uses components that are less expensive to manufacture, assemble, and maintain.

The annular chamber itself serves to unite the individual gas flows from each combustor can into a singular annular gas flow. The annular chamber also imparts a circumferential component to at least a portion of the singular annular gas flow. Thus, as a result of entering the annular chamber, the individual gas flows form a singular annular flow that flows both parallel to the longitudinal axis of the gas turbine combustion engine, and at least a portion of the singular annular gas flow also flows circumferentially around the longitudinal axis of the gas turbine combustion engine, as the singular annular gas flow leaves the annular chamber. In an embodiment, the annular chamber imparts rotation to entire singular annular gas flow. Once the singular annular gas flow leaves the annular chamber, it enters the first stage section of the turbine of the gas turbine combustion engine. The first stage section of the turbine includes the area of clearance between the downstream end of the annular chamber and the first row of turbine blades, as well as the first row of turbine blades themselves.

When compared to other gas turbine combustion engine configurations without flow redirecting vanes between the combustor cans and the first row of turbine blades, it can be seen that the interaction between the gasses from the combustor cans and the first row of blades of the singular annular gas flow this invention provides several advantages.

In configurations where individual flows from combustor cans are redirected from their original flow direction to a direction appropriate for interacting with the first row of blades, but the individual flows are not united into a single flow, trailing edges exist between the individual flows. As the blades of the first row of turbine blades rotate, they pass through areas where there is substantial flow, and the trailing edge areas between the flows, where there is much less flow. As they rotate, these blades thus experience areas of higher pressure and temperature upon them, and areas of lower pressure and temperature on them, resulting in high frequency mechanical stress oscillations, which shorten the life of the blades and other components.

In configurations where individual gas flows flow in a straight path from the combustor can to the first row of turbine blades, maximum energy is conserved as the gasses flow from the combustor can to the first row of turbine blades, but trailing edges still exist between flows, producing mechanical stress oscillations. In addition, from the perspective of the turbine blades, the direction of the gasses flowing onto the turbine blades abruptly changes as the blades rotate from the flow coming from one combustor to the flow coming from another combustor, because each flow path is offset from its adjacent flow paths. These changes in the direction between gas flows also result in oscillations in mechanical stresses. Thus, while maximum energy is delivered to the turbine blades in these configurations, the blades also see violent changes in pressure resulting in mechanical stresses on the blades that can limit blade life.

In addition to blade stresses, seals within the gas turbine engine must be designed to handle peak pressures. If peak pressures can be reduced by a more uniform flow, the seals may work more efficiently, or may be designed to handle lower operating pressures, and are less likely to wear, or ultimately, fail. Also, better performing seals are better able to preserve the most valuable, highest energy gasses to be delivered to the blades, and not lost through the seals.

This invention uniquely presents to the first row of turbine blades a singular annular gas flow that is flowing both longitudinally and circumferentially, but which originated as multiple, individual gas flows. As a single, rotating flow, free from the trailing edges of the prior art, the pressure, temperature, and flow direction gradients of the singular annular gas flow as it passes through a plane defined by the upstream edge of the first row of turbine blades are much smaller than the pressure, temperature, and flow direction gradients of the individual flows of the prior art as they flow through the same plane. As such, this invention strikes a balance between the amount of energy that is lost uniting individual gas flows and imparting a circumferential rotation to the resulting singular annular gas flow, and the improved mechanical longevity of the blades, seals, and other turbine components resulting from lower pressure, temperature, and flow direction gradients throughout the flow.

FIG. 1 shows a schematic representation of a one piece transition duct between the combustor can and the first row of turbine blades.

Figure 2:
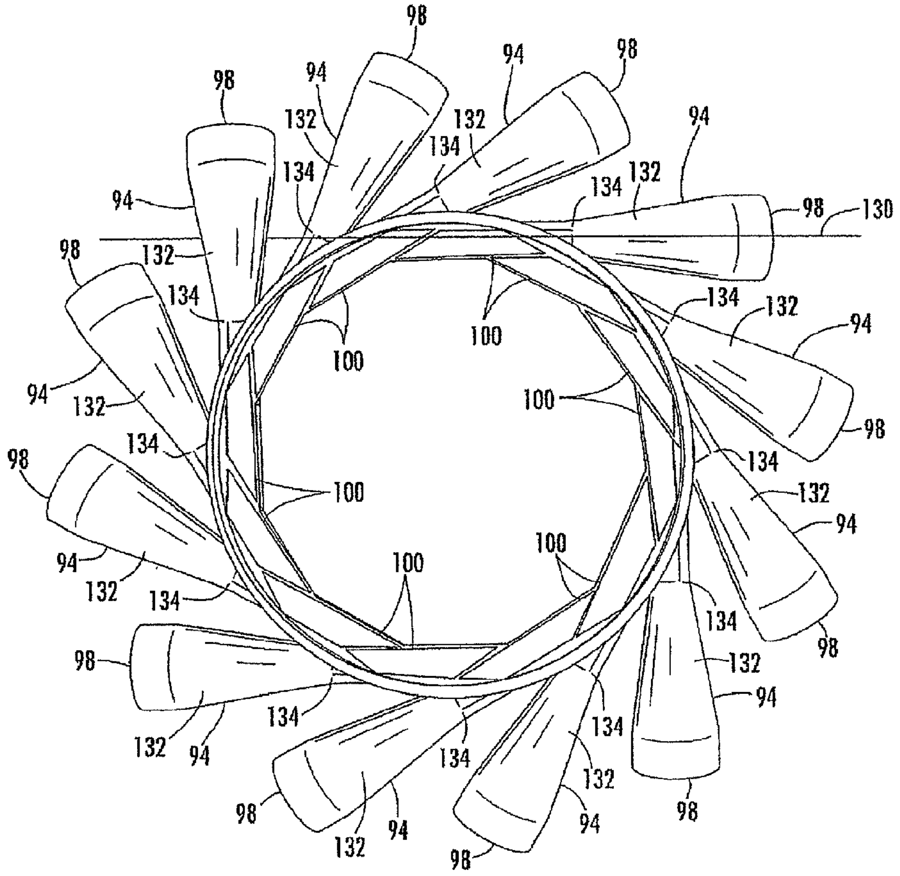
FIG. 2 shows a schematic representation of a system that guides gas flows from each combustor can in a straight line to the first row of turbine blades.

FIG. 2 shows a schematic representation of a system that guides gas flows from each combustor can in a straight line to the first row of turbine blades.

Figure 3:
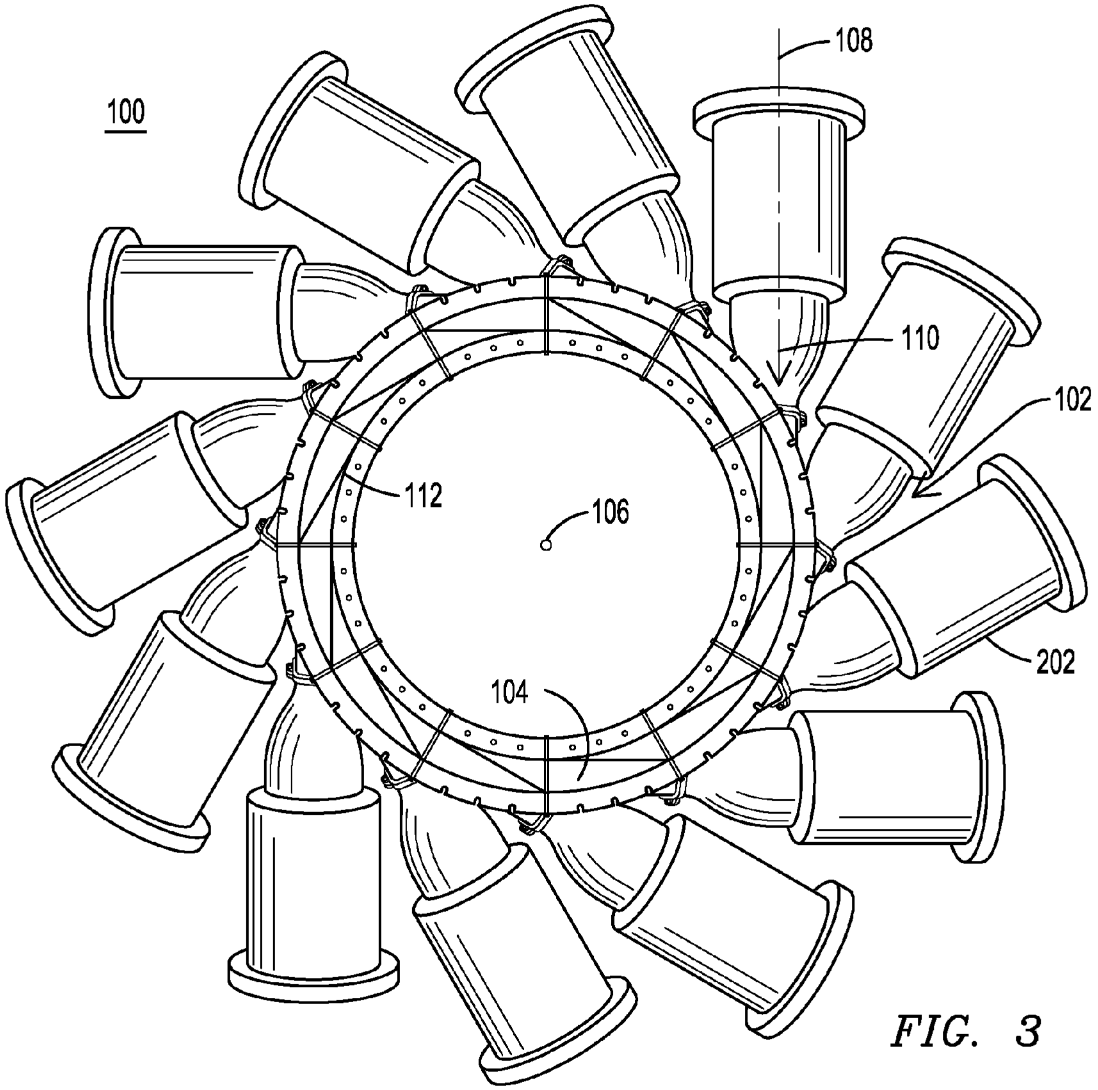
FIG. 3 shows an assembled transvane system and the annular chamber it forms as it would appear in a gas turbine combustion engine, viewed looking upstream.

FIG. 3 is a view of a system 100 attached to respective combustor cans 202, where the system 100 is made of transvane modules 102 of the present invention that form a transvane annular chamber 104, oriented as though installed in a gas turbine combustion engine (not shown), as it would appear to one looking upstream toward the intake end of a gas turbine combustion engine from the exhaust end. The center of the circle defined by the transvane annular chamber 104 coincides with the longitudinal axis 106 of the gas turbine combustion engine.

Each transvane module 102 has a longitudinal axis 108 which defines the longitudinal axis of each component of that transvane module 102 as well as the flow direction 110 of the gas flow in that module. Each transvane module 102 introduces gasses into the transvane annular chamber 104 from respective combustor cans 202. The resulting direction of the singular annular flow through the transvane annular chamber 104 is thus determined by the directions 110 of the flows entering it, and the configuration of the transvane annular chamber 104. Accordingly, flow through the transvane annular chamber 104 can be oriented to achieve an optimal angle of attack for the first row of turbine blades by properly orienting the longitudinal axes 108 of the transvane modules 102.

Figure 4:
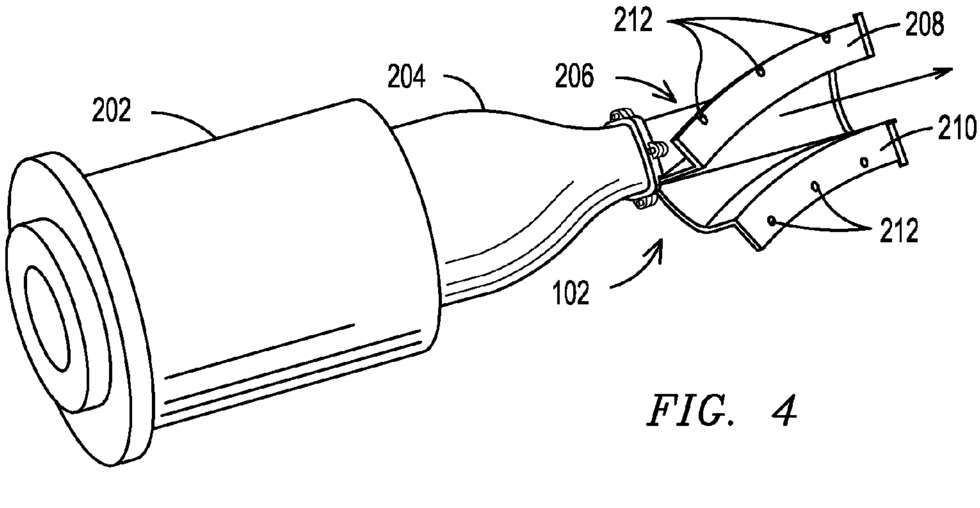
FIG. 4 shows an individual modular transvane assembly of the system of FIG. 3.

FIG. 4 shows an individual transvane module 102 of system 100 of FIG. 3 assembled to a combustor can 202. The combustor can 202 is seen connected to a modular duct 204 which is in turn connected to an integrated exit piece 206. The integrated exit piece 206 serves as the annular chamber end, or annular chamber component, of the transvane module 102. Each integrated exit piece defines a portion of the transvane annular chamber 104.

Figure 5:
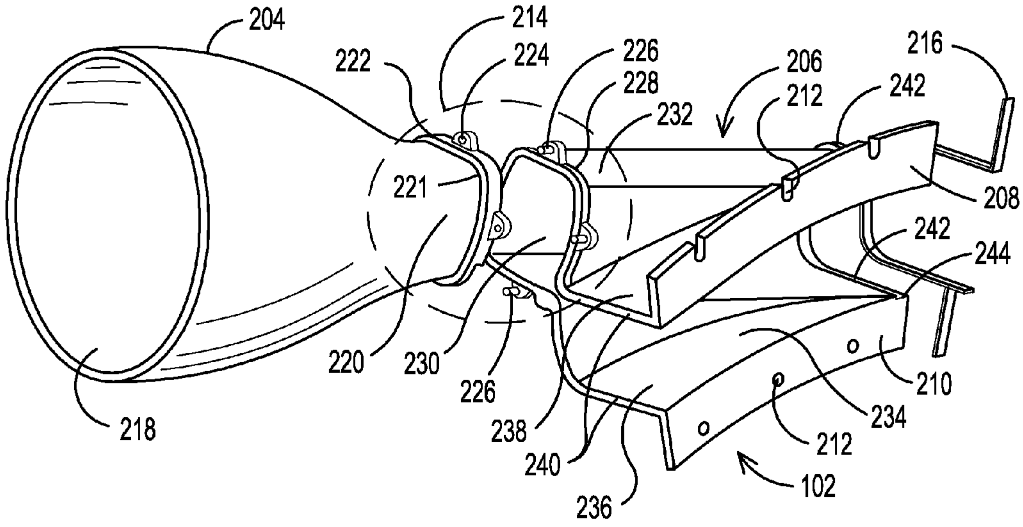
FIG. 5 is an exploded view showing the components of the modular transvane assembly of FIG. 4.

FIG. 5 shows an exploded view of the transvane module 102, which includes a modular duct 204, the integrated exit piece 206, bolted joint 214, and seal 216 of an embodiment. Modular duct 204 has an upstream end 218 that seals around the downstream end (not shown) of the combustion can 202. The cross section at downstream end 220 of modular duct 204 is shown as four sided with rounded corners 221, but need not be limited to this configuration. Flange 222 is formed at the downstream end 220 of the modular duct 204. Flange 222 contains openings 224 for fasteners 226, such as bolts or the like, and is designed to form a seal with flange 228 on the upstream end 232 of integrated exit piece 206. Flange 228 contains fasteners 226 to secure modular duct 204 to integrated exit piece 206. Other embodiments may employ other configurations for the components of the transvane module 102, and alternative ways of connecting any components, while keeping with the spirit of the invention.

Integrated exit piece 206 has an inlet chamber 230, a transition chamber 234, an upper flange 208, a lower flange 210, and holes or slots 212 in the flanges, an inner arcuate wall 236, an outer arcuate wall 238, a first end 240, a second end 242, and a recess 244 in the second end 242. Seal 216 fits in recess 244, which slips over the first end 240 of another adjacent zero turning transvane to form a seal between adjacent transition chambers. Gasses flow from the combustion can 202, through the modular duct 204 where the flow is necked down and converted from a circular cross section to a substantially four sided cross section, into the inlet chamber 230, through the inlet chamber 230 to the transition chamber 234, which forms the transvane annular chamber 104 when assembled to other transition chambers, through the transition chamber 234, and immediately onto the first row of turbine blades (not shown), without the need for any intervening, flow redirecting vanes. The exact geometry of the transition chamber 234 and the orientation of the transition chamber 234 with respect to the inlet chamber 230 will be the determined by the design chosen for the transvane annular chamber 104 desired, the desired flow within the annular chamber, and the number of transvane modules 102 used.

Figure 6:
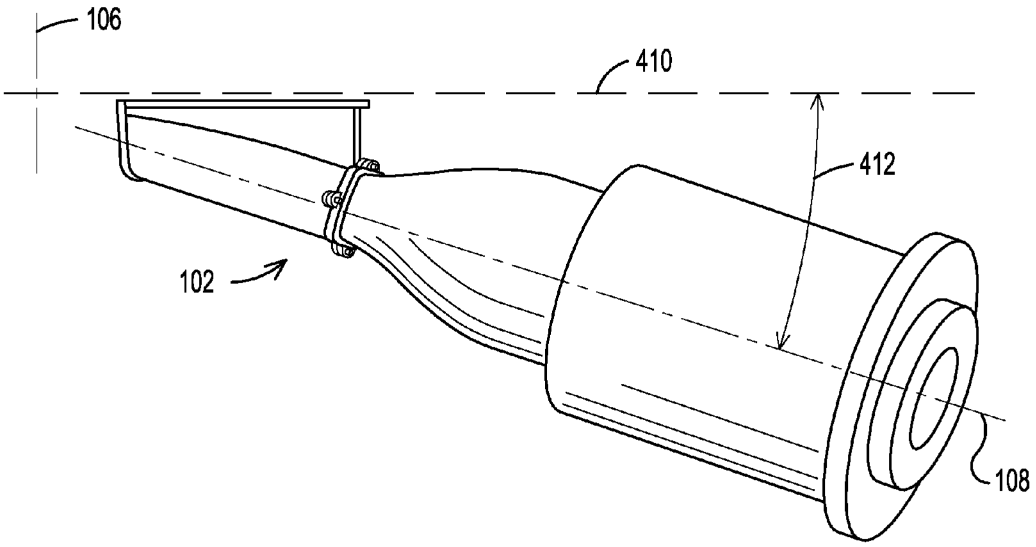
FIG. 6 shows a single modular transvane assembly as oriented relative to a radial plane defined by the first row of turbine blades.

FIG. 6 shows a transvane module 102 and combustor can 202, the longitudinal axis 106 of the gas turbine combustion engine, an end view of a plane 410 which is perpendicular to the longitudinal axis 106 of the gas turbine combustion engine and flush with the upstream most surface of the first row of turbine blades, the longitudinal axis 108 of the transvane module, and an angle 412, defined as the angle of intersection between the plane 410, and the longitudinal axis 108 of the transvane. Angle 412 can be any angle determined to be of advantageous design for a particular design for the first row of turbine blades. Angle 412 has been shown to be effective when in the range of 5 and 50 degrees. In one embodiment angle 412 is seventeen degrees (17°).

Figure 7:
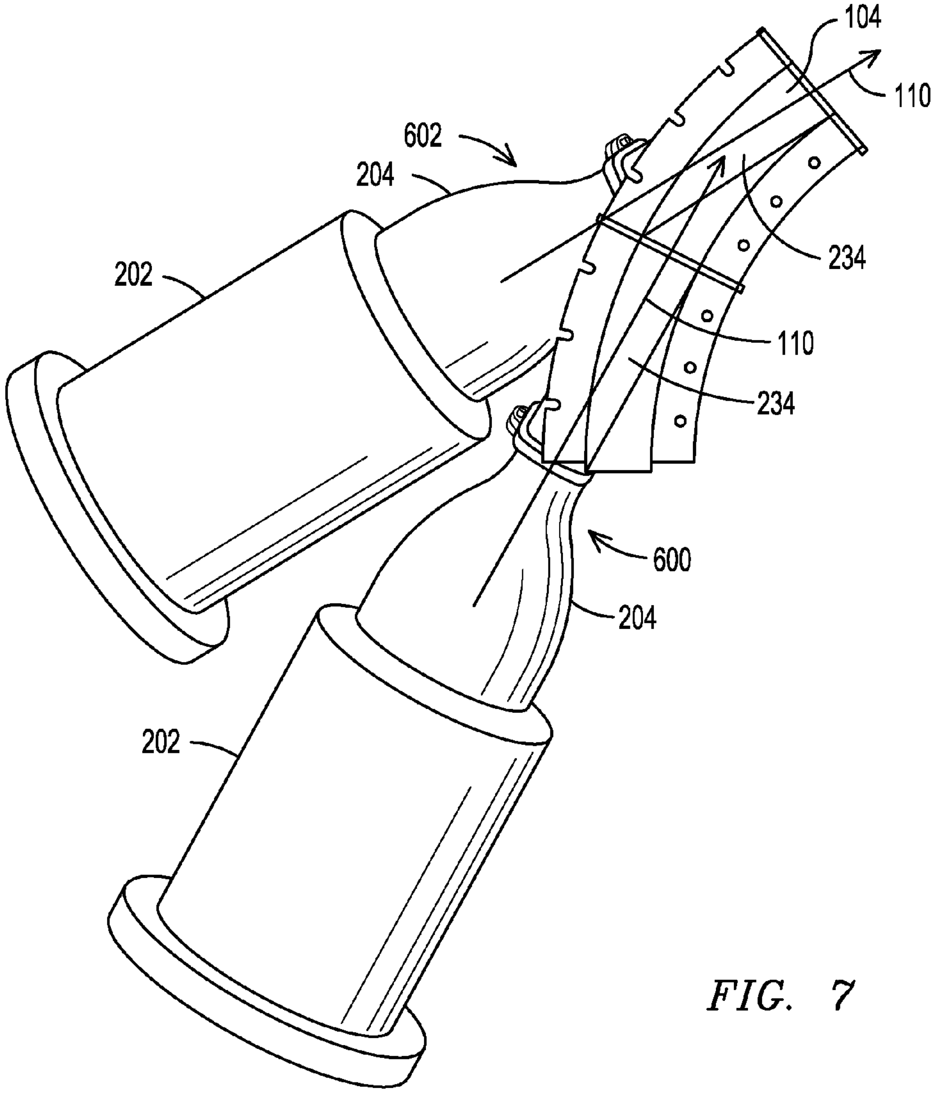
FIG. 7 shows two modular assemblies assembled together, the flow path of the gasses within each assembly, and the partial annular chamber created by the integrated exit piece sections.

FIG. 7 shows two transition chambers 234 of two separate transvane modules 600, 602 and combustor cans 202, assembled together to form part of transvane annular chamber 104. Arrows 110 depict the direction 110 of the flow of gasses through each of the transvane modules 600, 602, and how they travel through the shown portion of the transvane annular chamber 104.

Figure 8:
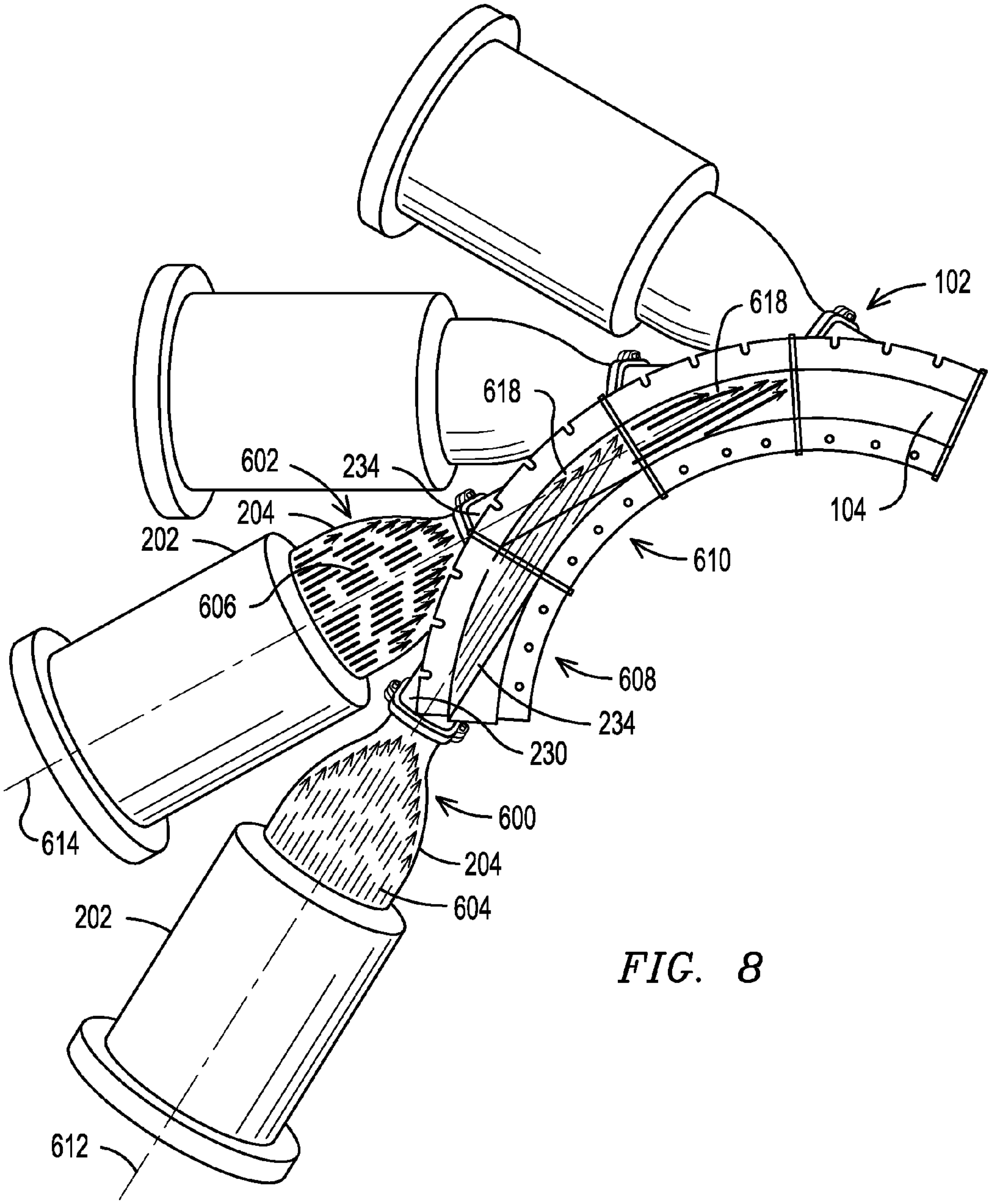
FIG. 8 is a schematic representation of four transvane modules assembled together, including those of FIG. 7, showing the gas flow of the first two adjacent modules as the gas flows through the assembly, as viewed from downstream.

FIG. 8 is a schematic representation of four transvane modules 102 with combustor cans 202 assembled together to form a portion of the complete system 100, including transvane modules 600 and 602 from FIG. 7, as viewed looking upstream. Shown in transvane module 600 is the gas flow 604 from transvane module 600 as it flows into the transvane annular chamber 104. Also shown in transvane module 602 is the gas flow 606 from transvane module 602 as it flows into the transvane annular chamber 104. Only two gas flows 604, 606 are shown. As can be seen, as flow 604 exits its modular duct 204 and flows along its flow axis 612 into the inlet chamber 230 of its transvane module 600, flow 604 continues from the inlet chamber 230 of its transvane module 600 to the transition chamber 234 of its transvane module 600, then into the transition chamber of adjoining transvane module 602, then out of the transition chamber 234 of transvane module 602 and into the blades (not shown). Thus, flow 604, which represents all flows in system 100, enters, travel through, and completely exit the transvane annular chamber 104 within the arc length of two adjoining integrated exit pieces 206.

Figure 9:
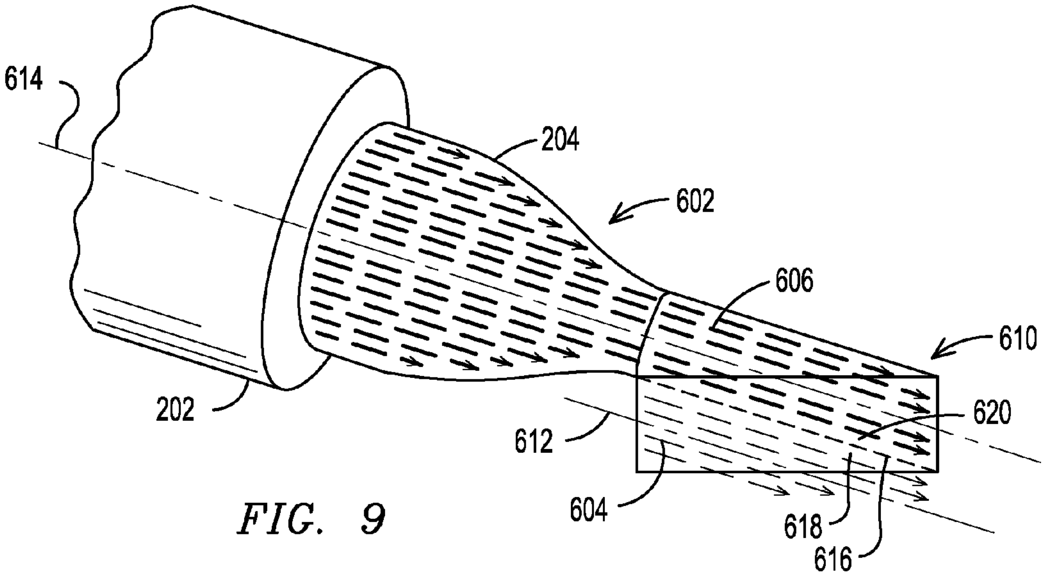
FIG. 9 is a schematic representation of a side view of the second transvane module of FIG. 8, viewed from outside the assembly, showing the two different gas flows within the second module.

FIG. 9 is a schematic side view of transvane module 602 of FIG. 8, including integrated exit piece 610, viewed from outside the system 100. It can be seen that flow 604 flows through integrated exit piece 610 of transvane module 602 at an angle, as does flow 606. Thus, the top 618 of flow 604 meets the bottom 620 of flow 606 at shear plane 616. Shear plane 616 is a region between the two flows 604, 606 that serves to keep both flows 604, 606 within their respective paths as they enter the transition chamber 234 of the integrated exit piece 610. This occurs in every transition chamber 234 of the system 100.

Figure 10:
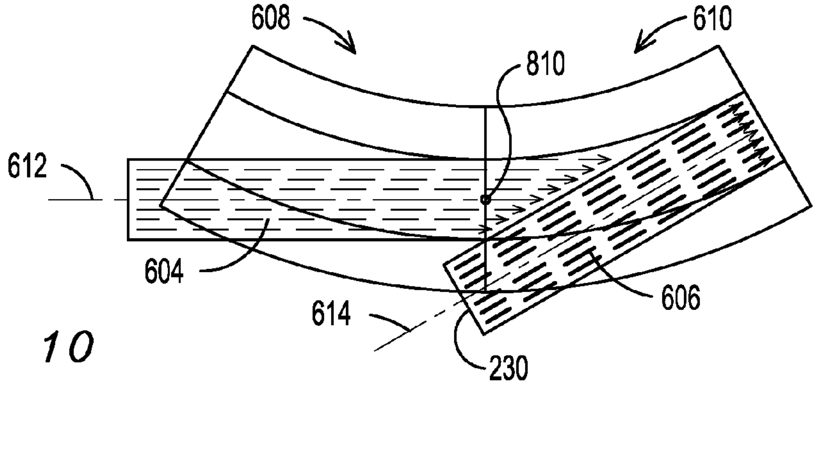
FIG. 10 is a schematic representation of a top view of the first two transvane modules of FIG. 8, showing the two different gas flows.

FIG. 10 is a schematic representation of flows 604, 606 and two integrated exit piece components 608, 610 of two adjacent transvane modules, (modular ducts and combustor cans not shown), looking downstream towards the blades (not shown). It can be seen that flow 606 enters the inlet chamber 230 of integrated exit piece 608 above flow 604, and flow 606 travels along its longitudinal axis 614. Flow 604 enters the transition chamber of integrated exit piece 608 at the junction 810 between the integrated exit pieces 608, 610.

Figure 11:
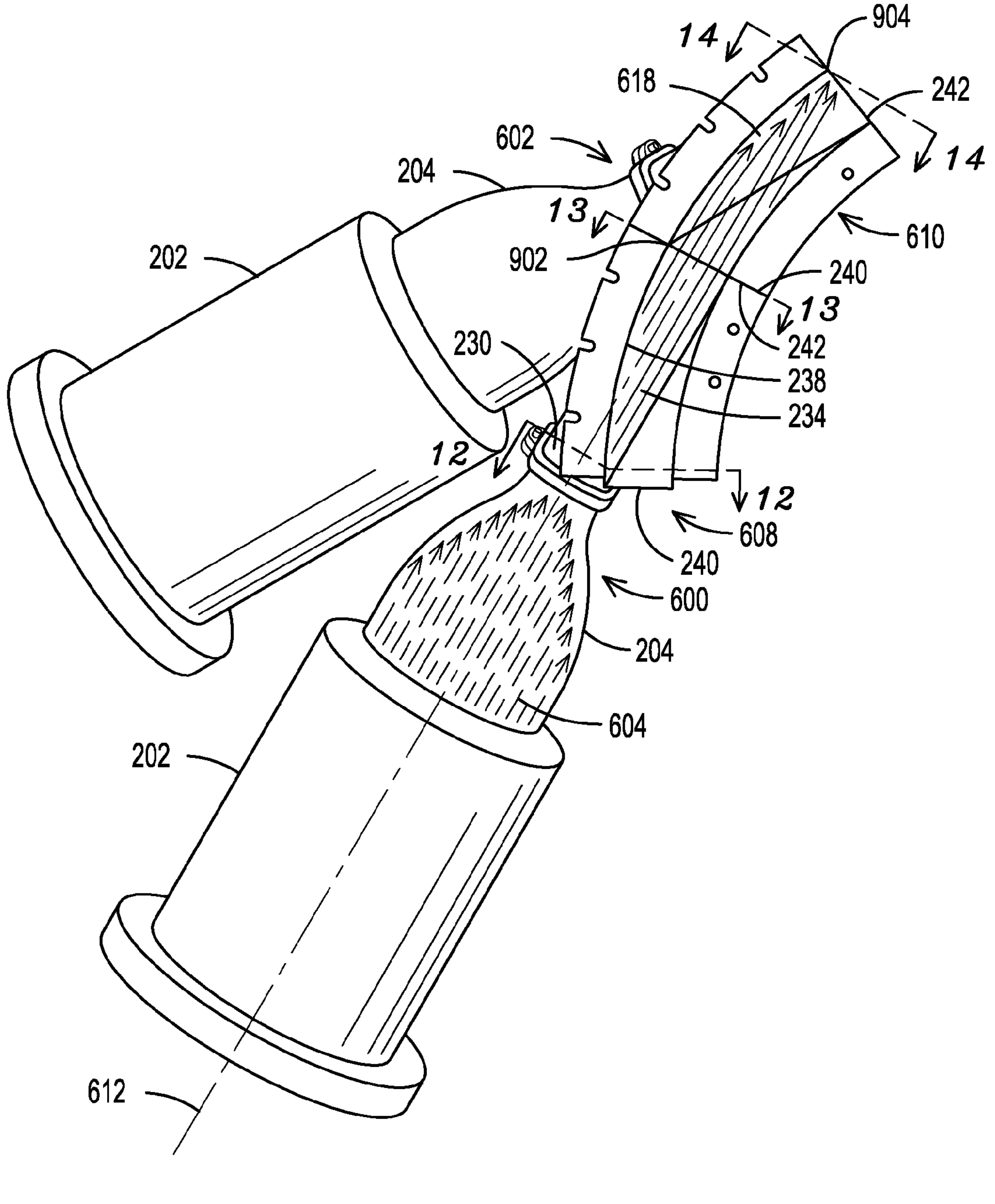
FIG. 11 is a schematic representation of the first transvane modules of FIG. 8, showing the flow from the first module, denoting three different places where cross sectional views of the flow are taken.
Figure 12:
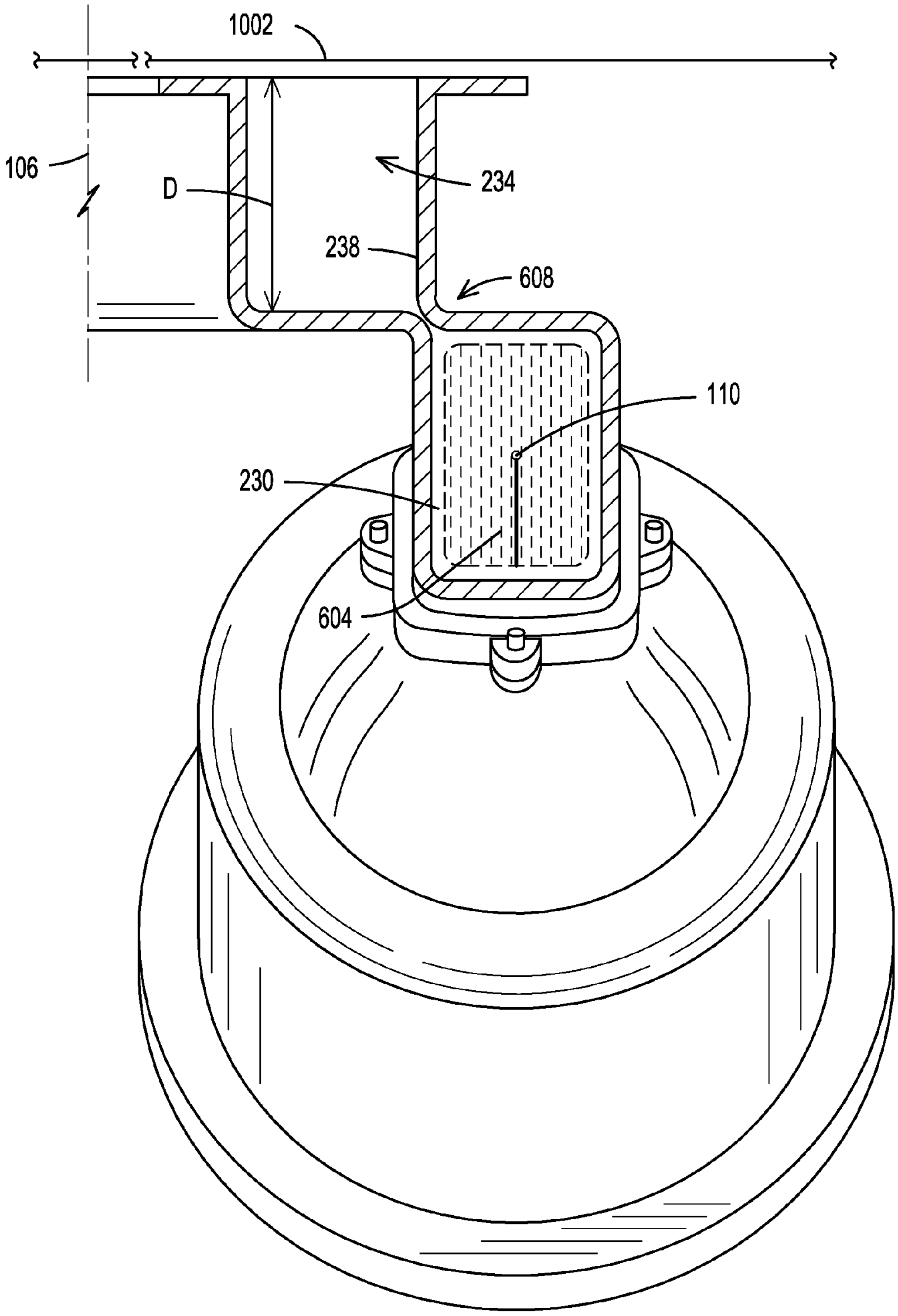
FIG. 12 is a schematic representation of cross section view 12-12 of FIG. 11 of a flow as it enters the inlet chamber of the integrated exit piece of its module.
Figure 13:
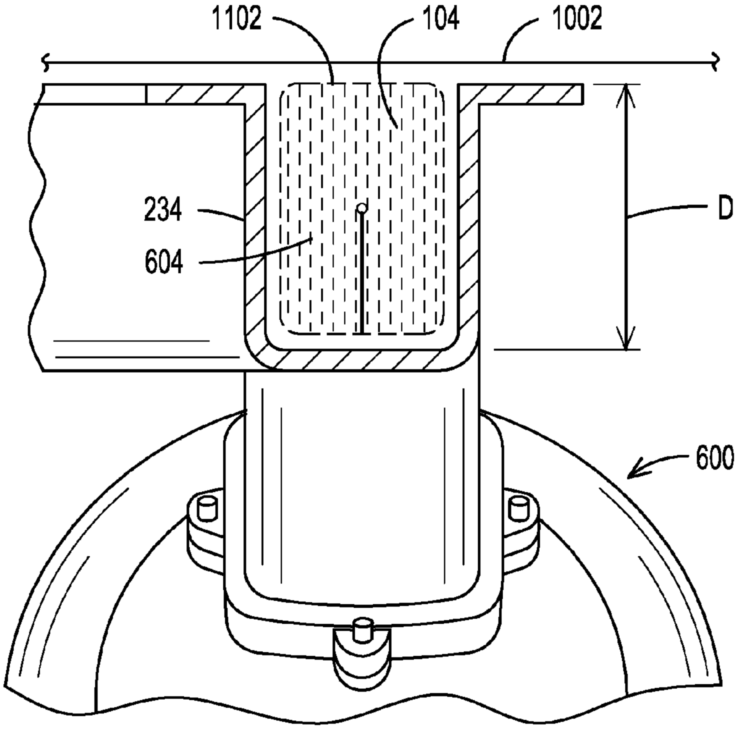
FIG. 13 is a schematic representation of cross sectional view 13-13 of FIG. 11 of the flow of FIG. 12 as it exits the transition chamber of its module and enters the transition chamber of the adjacent module.
Figure 14:
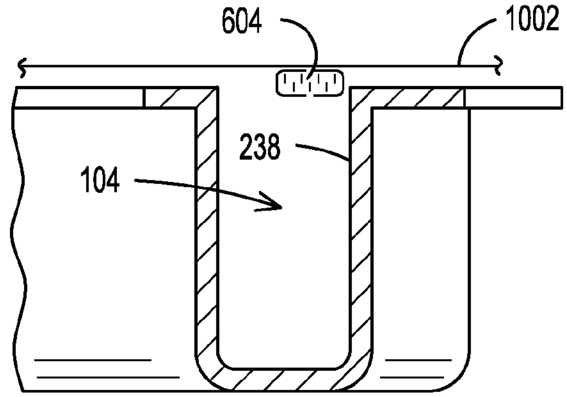
FIG. 14 is a schematic representation of cross sectional view 14-14 of FIG. 11 of the flow as it exits the transition chamber of the adjacent module.

FIG. 11 is a schematic representation of transvane modules 600 and 602 of FIG. 8 and combustor cans 202, showing only flow 604 as seen from downstream looking upstream, including cross sections 12-12,13-13, and 14-14 as shown on respective FIGS. 12-14. Cross section 13-13 is a cross section of the annular chamber, taken in a plane parallel to the longitudinal axis 106 of the gas turbine combustion engine, and perpendicular to the plane 1002 of the blades. Cross section 12-12 is parallel to cross section 13-13, but is in front of cross section 13-13. Cross section 14-14 is also parallel to cross section 13-13, but is behind cross section 13-13.

FIG. 12 is a schematic of a cross section 12-12 of FIG. 11 showing flow 604 as it enters the inlet chamber 230 of integrated exit piece 608 of transvane module 600. No other modules are shown, for clarity. Also shown is line 1002, which represents a plane of the upstream edge of the first row of turbine blades, and the gas turbine combustion engine longitudinal axis of the 106. The point of directional arrow 110 can be seen in the center of flow 604, as though flow 604 flows out of the page and toward the top of the page. Flow 604 enters inlet chamber 230 of its integrated exit piece 608 of its transvane module 600 while slightly offset from transition chamber 234 of its integrated exit piece 608. As the flow 604 enters the inlet chamber 230, it is entirely radially outside transition chamber 234, and is also entirely on the engine inlet side of transition chamber 234. Since each transition chamber 234 is part of transvane annular chamber 104, flow 604 is also entirely radially outside and on the engine inlet side of the transvane annular chamber 104 as well.

Also shown is the letter "D", representing the depth of the common interior volume of the annular chamber. Alternatively "D" can be considered the length of the common interior volume of the annular chamber along the gas turbine longitudinal axis. It is in this common interior volume of the annular chamber where the individual gas flows are united into the singular annular gas flow. Accordingly, D also equates to the axial length, along the gas turbine combustion engine longitudinal axis, of the singular annular gas flow, before it leaves the annular chamber. D can vary from shallow, i.e. 0.10 inches, to any depth necessary to produce a desired singular annular flow. In an embodiment D is substantially equivalent to the greatest width, i.e. the widest point, of the active airfoil portion of the first row of turbine blades. The active airfoil portion of a blade being the region of the blade onto which flows 604 are directed.

Flow 604 travels along its flow axis 612 until it reaches the second end 242 of the integrated exit piece 608 of its transvane module 600, where the second end 242 of integrated exit piece 608 of transvane module 600 meets the first end 240 of integrated exit piece 610 of adjacent transvane module 602. At this location flow 604 is positioned entirely within the transvane annular chamber 104, as shown in FIG. 13, and the edge portion 1102 of flow 604 is about to enter the first row of turbine blades represented by line 1002. No other modules are shown in FIG. 13, for sake of clarity.

Thus, as flow 604 travels along its flow axis 612 from the entrance of inlet chamber 230 of its integrated exit piece 608 of its transvane module 600, to the second end 242 of its transition chamber 234, flow 604 goes from radially outside and upstream of the transvane annular chamber 104, to fully within transvane annular chamber 104. Stated another way, while flowing through one integrated exit piece 608 flow 604 transitions from completely outside the transvane annular chamber 104 to completely inside transvane annular chamber 104. Similarly, while flow 604 flows through the integrated exit piece 610 of the next, adjacent transvane module 602, it will transition from completely within the transvane annular chamber 104 to completely outside the transvane annular chamber 104 on the downstream side of the transvane annular chamber 104.

To illustrate this concept, an embodiment is chosen where flow, once in the transition chamber 234, exits the annular chamber in approximately the arc length of a single transition chamber 234. While flowing along its flow axis 612, and upon leaving its integrated exit piece 608 of its transvane module 600 and entering the integrated exit piece 610 of the adjacent transvane module 602, edge portions 1102 of flow 604 begin to exit the integrated exit piece 610 of the adjacent transvane module 602 and enter the first row turbine blades, represented by line 1002, imparting rotation to the blades. As integrated exit piece 610 of adjacent transvane module 602 forms part of the transvane annular chamber, flow 604 begins to exit the transvane annular chamber 104 and finishes exiting the transvane annular chamber 104 within the arc length of the transition chamber 234 of the integrated exit piece 610 of the transvane module 602 adjacent to where flow 604 originated, which is consistent for each flow throughout the system. Thus, as can be seen in FIG. 14, which is a schematic cross section of flow 604 (all other flows and structural details omitted) at the second end 242 of transition chamber 234 of integrated exit piece 610 of adjacent transvane module 602, the bulk of flow 604 has left transvane annular chamber 104, with only a small portion possibly yet in the blades (not shown) due to the clearance gap between the transvane annular chamber 104, the blades (not shown), and the particular geometry chosen.

Were the transition chamber 234 configured to be a straight path, flow 604 would travel unimpeded through the transition chamber 234 and into the first row of blades. However, the transition chamber 234 is part of transvane annular chamber 104, which is arcuate. Thus, while flow 604 travels in an unimpeded straight path through the inlet chamber 230 to the transition chamber 234, once in the transition chamber 234, flow 604 begins to encounter outer arcuate wall 238 of the transvane annular chamber 104, shown in FIGS. 5, and 12-15. Outer arcuate wall 238 constrains flow 604, keeping flow 604 from traveling beyond the outer arcuate wall 238 of the transvane annular chamber 104, which forces flow 604 to flow circumferentially around the longitudinal axis 106 of the gas turbine engine, which is also the longitudinal axis of the transvane annular chamber 104. Thus, transition chamber 234 serves to impart circumferential motion to flow 604 and simultaneously deliver gasses to the first row of blades.

In one embodiment, angle 412 from FIG. 6, and D of FIG. 12 is chosen such that in the resulting configuration flow 604 exits the transition chamber 234 along the entire arcuate length of a single transition chamber 234. Other embodiments contemplated choose angle 412 and D such that flow 604 requires the arcuate length of more than one transition chamber 234 to completely exit the transvane annular chamber 104. Embodiments where angle 412 and D are chosen such that flow 604 exits the annular chamber in less than the arc length of a single transition chamber are also contemplated. In embodiments where a gas flow exits the transvane annular chamber 104 in less than the arc length of the transition chamber 234, and thus the circumferential flow imparted to the flow 604 and resulting mixing of flows into the singular annular flow are minimal, the mechanical stress advantages of the invention would be reduced, but the amount of energy delivered to the first row of turbine blades would be increased. Conversely, in embodiments where a gas flow exits the transvane annular chamber 104 in greater than the arc length of the transition chamber 234, greater circumferential flow is imparted, and the singular annular flow is more uniform, which would increase the mechanical stress advantages of the invention, but would decrease the amount of energy delivered to the first row of turbine blades. Specific applications will determine the proper balance of factors, and resulting configuration.

Transition chamber 234 is one of several chambers that define the transvane annular chamber 104. Accordingly, transvane annular chamber 104 collectively unites the individual flows into a singular annular flow, while imparting circumferential motion at least a portion of the singular annular flow. While each flow 604 enters each transition chamber 234 individually, each flow typically exits the transition chamber 234 across at least the entire arc length of a single transition chamber 234. Thus, because flow 604 exits the transition chamber 234 along the entire length of the transition chamber 234, and the transvane annular chamber 104 is composed of multiple transition chambers, when seen as a whole, substantially every portion of the downstream side of the transvane annular chamber 104 will be delivering flow to the blades. This is how the present invention unites straight, individual gas flows into a singular annular gas flow with a circumferential component to the flow direction. The specific configuration of angle 412 of FIG. 6 and D of FIG. 12 will determine how much circumferential motion is imparted to each flow, and how uniform the singular annular flow becomes, and consequently, the resulting pressure, temperature, and flow direction gradients that the first row of turbine blades will see in the delivered singular annular flow.

Figure 15:
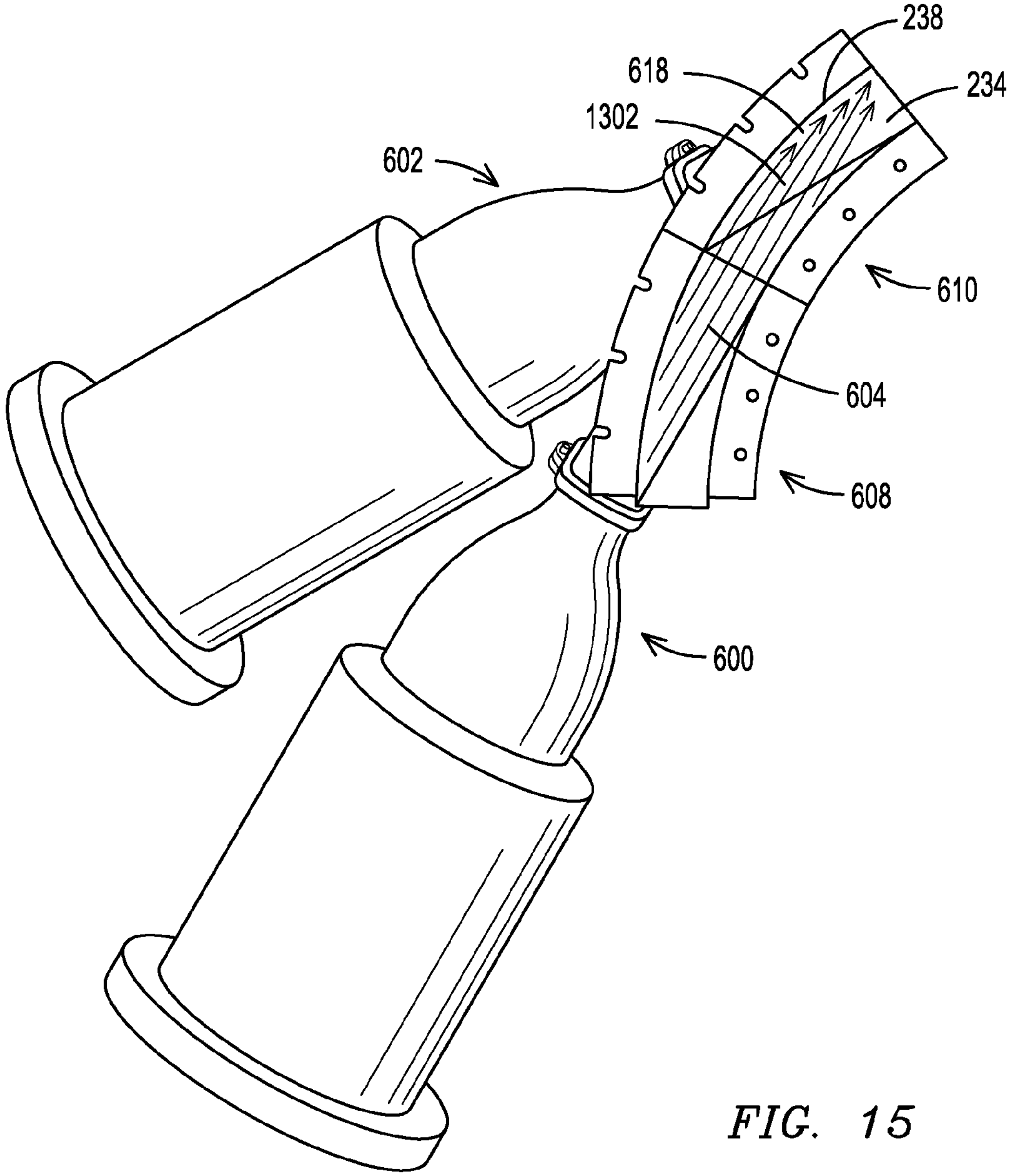
FIG. 15 is a schematic representation of the first two transvane modules of FIG. 8, showing the flow from the first module, and a region of flow where circumferential motion is imparted by the transvane outer arcuate wall.

FIG. 15 is a schematic, representation of transvane modules 600 and 602 of FIG. 8, and flow 604, showing region 618. Region 618 is the region within the transition chamber 234 of transvane module 602 where a portion of the flow 604, coming from transvane module 600, is constrained by outer arcuate wall 238 of the transvane annular chamber 104. This is the region where circumferential motion is imparted to flow 604. Thus it can be seen that, depending on the configuration of the transvane annular chamber 104, flow 604 as it exits transition chamber 234 may contain a portion that is flowing circumferentially, and a portion that is not flowing circumferentially. Accordingly, the configuration of the transvane annular chamber 104 can be adjusted by adjusting angle 412 and depth D, such that the flow 604 leaving the transition chamber 234, and thus the flow leaving transvane annular chamber 104, can range from comprising flow where the entirety of the flow has had circumferential motion imparted to it, to comprising flow where none of the flow has had circumferential motion imparted to it.

Figure 16:
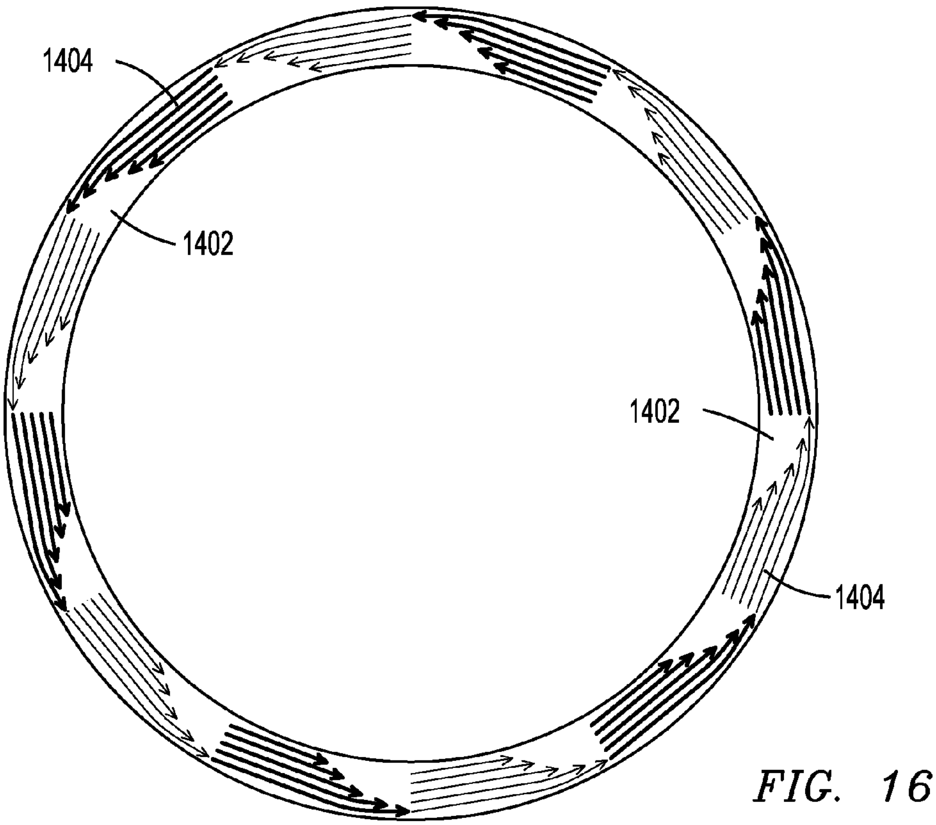
FIG. 16 is a schematic representation of the direction of the singular annular gas flow as it exits the transvane annular chamber, as seen looking downstream, immediately prior to contacting the first row of turbine blades.

FIG. 16 is a schematic representation of the flows as they exit respective transition chambers 234 in an embodiment where the flow each exit the transvane annular chamber 104 over the arc length of one transition chamber, and contact the first row of turbine blades (not shown), as seen looking downstream. Thus, the flow shown in this schematic shows how flow comes into contact with the first row of turbine blades (not shown). It can be seen that there is no gap, or trailing edge, between regions where flow is present. The inventors understand that a region of flow exiting from a particular integrated exit piece 206 may not contain completely uniform flow, and may include a region 1402 of relatively lighter flow, or a region 1404 of relatively higher flow.

As has been shown, as a result of this innovative design, gasses from can combustors of a can annular gas turbine combustion engine will flow a short distance from the combustion can 202, through the modular duct 204, into the integrated exit piece 206 inlet chamber 230, through to the transition chamber 234, which serves as a portion of the transvane annular chamber 104, which imparts rotation to at least a portion of the flow, and then immediately onto the first row turbine blades, efficiently imparting rotation to them. This invention creates a short, straight, sealed gas flow path to an annular chamber that that properly orients the gas flow to be directed to the first row of gas turbine blades, with a reduced number of seals and without flow redirecting vanes. This invention thus reduces mechanical stress on the blades and associated components by reducing pressure, temperature, and flow direction gradients that the first row of turbine blades see as they rotate. This configuration also increases efficiency by reducing aerodynamic losses due to turbulence created by a trailing edge, the friction of a longer flow path, and flow redirection, and by reducing the amount of flow lost through the seals. While providing all of these advantages, this configuration retains the can configuration, which isolates cans from each other, which provides the benefit of reducing combustion dynamics.

Even more, the components used do not require the exacting tolerances or difficult to machine shapes of prior designs, which are very expensive. A shorter cooling path means less surface area of the components to be cooled, which reduces manufacturing and operating costs, and reduces the opportunity for cooling related component damage. This design completely obviates the need for a first row of turning vanes, further reducing the manufacturing, operating and maintenance costs. Still further, this invention is modular, and is easy to assemble and disassemble, and assembly can be performed on a bench away from the engine, simplifying assembly and maintenance and thus reducing maintenance costs. Thus, this innovative assembly efficiently delivers gas flow energy to the first row turbine blades, yet is less costly to manufacture, assemble, and maintain.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An arrangement for delivering gasses from a plurality of combustors of a can annular gas turbine combustion engine to a turbine first stage section comprising a first row of turbine blades, the arrangement comprising a flow-directing structure for each combustor, wherein each flow-directing structure comprises a straight path portion for receiving a gas flow from a respective combustor, and an annular chamber end, wherein the respective annular chamber ends together define an annular chamber that is oriented concentric to a gas turbine engine longitudinal axis, for delivering the gas flow to the turbine first stage section;

wherein gasses flow from respective combustors, through respective straight paths, and into the annular chamber as respective straight gas flows, in respective substantially uniform flow directions;

wherein the annular chamber is configured to unite the respective straight gas flows to form a singular annular gas flow and wherein the annular chamber is configured to impart circumferential motion to the singular annular gas flow before the singular annular gas flow exits the annular chamber.

2. The arrangement of claim 1, wherein each flow-directing structure comprises a downstream cross sectional area that is less than an entry cross sectional area, to define a throat effective to insulate the respective combustor from pressure pulsations originating downstream of the throat.

3. The arrangement of claim 1, wherein an axial length of the singular annular gas flow within the annular chamber is greater than or equal to 0.1 inches, and less than or equal to a greatest width of an active airfoil portion of a blade of the first row of turbine blades.

4. The arrangement of claim 1, wherein an axial length of the singular annular gas flow within the annular chamber is greater than or equal to 0.25 inches, and less than or equal to 1.0 inch.

5. The arrangement of claim 1, wherein an axial length of the singular annular gas flow within the annular chamber is greater than or equal to 0.5 inches, and less than or equal to 1.0 inch.

6. The arrangement of claim 1, wherein a longitudinal axis of a respective straight path portion intersects a plane of the first row of turbine blades at between 5 and 50 degrees.

7. The arrangement of claim 1, wherein a longitudinal axis of a respective straight path portion intersects a plane of the first row of turbine blades at 17 degrees.

8. A can annular gas turbine combustor comprising the arrangement of claim 1.

9. In a can annular gas turbine engine, an improvement comprising orienting each combustor can and a straight path portion of a transition module to share a longitudinal axis with a gas flow of a gas flowing from the respective combustor can, wherein the gas flow travels through respective straight path portions, into a common annular chamber defined by adjoined downstream annular chamber ends of the transition module, wherein the common annular chamber is configured to combine individual gas flows into a singular annular gas flow, and the common annular chamber is further configured to impart circumferential rotation to the singular annular gas flow upstream of a first stage section of the gas turbine engine.

10. The improvement of claim 9, the transition module further comprising a downstream cross sectional area that is less than an upstream cross sectional area, to define a throat effective to insulate the respective combustor cans from pressure pulsations originating downstream of the throat.

11. The improvement of claim 9, wherein the common annular chamber is shaped to define an area of shear between adjacent gas flows, and wherein the areas of shear constrain the respective adjacent gas flows as the gas flows in the annular chamber.

12. The improvement of claim 10, wherein the transition module comprises interchangeable modules each comprising a straight path portion and an annular chamber end.

13. The improvement of claim 12, wherein a straight path component forms the straight path portion, and an annular chamber component forms the annular chamber end, and the straight path component and the annular chamber component are adapted to sealingly engage each other.

14. The improvement of claim 9, wherein an axial length of the singular annular gas flow within the annular chamber is greater than or equal to 0.1 inches, and less than or equal to a height of an active airfoil portion of a blade of the first stage section of the gas turbine engine.

15. The improvement of claim 9, wherein an axial length of the singular annular gas flow within the annular chamber is greater than or equal to 0.25 inches, and less than or equal to 1.0 inch.

16. The improvement of claim 9, wherein an axial length of the singular annular gas flow within the annular chamber is greater than or equal to 0.5 inches, and less than or equal to 1.0 inch.

17. A can annular gas turbine combustor comprising the improvement of claim 9.

18. An arrangement for delivering gasses from a plurality of combustors of a can annular gas turbine combustion engine to a turbine first stage section comprising a first row of turbine blades, the arrangement comprising:

a flow-directing structure for each combustor, wherein each flow-directing structure comprises a cone for receiving a gas flow from a respective combustor and providing a straight cone gas flow path to an annular chamber end; and wherein the annular chamber end comprises a straight first flow path coaxial with the straight cone gas flow path and configured to deliver gas flow received from the cone to a downstream adjacent annular chamber end second flow path; and wherein the annular chamber end comprises a second flow path coaxial with an upstream adjacent annular chamber end first flow path and configured to receive gas flow from the upstream adjacent annular chamber end first flow path and deliver it downstream; and wherein the first flow path and the second flow path within any annular chamber end are geometrically discrete; and wherein annular chamber ends together define an annular chamber oriented concentric to a gas turbine engine longitudinal axis and upstream of the turbine first stage section.

19. The arrangement of claim 18, wherein the cone and the annular chamber end of each flow directing structure are discrete components.

* * * * *